United States Patent [19]

Ueno et al.

[11] Patent Number: 5,181,433
[45] Date of Patent: Jan. 26, 1993

[54] GEAR

[75] Inventors: Kiyoshi Ueno, Ichikawa; Teisuke Bushimata, Tokyo, both of Japan

[73] Assignee: Chiba Dies Co., Ltd., Tokyo, Japan

[21] Appl. No.: 899,001

[22] Filed: Jun. 15, 1992

Related U.S. Application Data

[63] Continuation of Ser. No. 680,935, Apr. 5, 1991, abandoned.

[30] Foreign Application Priority Data

Sep. 20, 1990 [JP] Japan .................................. 2-251613

[51] Int. Cl.⁵ ............................................. F16H 55/18
[52] U.S. Cl. ........................................ 74/409; 74/445
[58] Field of Search ......................... 74/409, 440, 445

[56] References Cited

U.S. PATENT DOCUMENTS

| | | | |
|---|---|---|---|
| 1,240,126 | 9/1917 | Dubois | 74/440 |
| 1,247,922 | 11/1917 | Battle | 74/445 |
| 1,418,461 | 6/1922 | Pierce | 74/440 |
| 2,845,809 | 8/1958 | Hetzel | 74/440 |
| 2,868,033 | 1/1959 | Gaither | 74/440 |
| 3,037,396 | 6/1962 | Martin | 74/440 |
| 3,127,784 | 4/1964 | O'Neill | 74/440 |

FOREIGN PATENT DOCUMENTS 2215807 9/1989 United Kingdom .................. 74/440

*Primary Examiner*—Leslie A. Braun
*Assistant Examiner*—William O. Trousdell
*Attorney, Agent, or Firm*—Wenderoth, Lind & Ponack

[57] ABSTRACT

A gear is provided with double rows of teeth having the same pitch circle, which are deviated from each other in the circumferential direction. The gear can be mutually engaged with another counterpart identical with no backlash between the meshed teeth, whereby a rotary motion can be efficiently and smoothly transmitted between the rotating gears engaged without involving vibrations and noises.

3 Claims, 3 Drawing Sheets

GEAR

This application is a continuation of now abandoned application, Ser. No. 07/680,935, filed Apr. 5, 1991.

BACKGROUND OF THE INVENTION

This invention relates to a gear having double tooth rows the tooth positions of which deviate from each other in the pitch circle direction.

Gears engaged with each other by and large bring about vibrations and noises when rotating to transmit a rotary motion. The vibrations and noises produced during the rotation of the engaged gears are due to backlash (gap between meshed teeth) which is intentionally provided between the meshed teeth of the engaged gears in order to smoothly rotate the gears to transmit the rotary motion and deviation in circular pitch attributable to an error in measurement in manufacturing the gear. Thus, the aforementioned backlash (clearance) is necessary for making up for the deviation in circular pitch. Therefore, the conventional gears cannot essentially be free from such disadvantages.

Furthermore, the gears inevitably turn out to be worn during service to make the backlash larger. As a result, the vibrations and noises produced in rotating the engaged gears become conspicuous. Though a gear system with a structure capable of positively lessening the backlash might be able to be accomplished, it would be complicated in structure and difficult to manufacture.

Helical gears can decrease vibrations and noises produced during rotation and transmit a rotary motion smoothly, but entail problems such as difficulty encountered in the manufacture thereof and production of undesirable thrust stress. Though double helical gears produce little thrust stress, the difficulty in the manufacture of the helical gear remains the same. Beyond these drawbacks suffered by the gears of this type, vibrations and noises produced inherently in rotating the engaged gears can not be prevented.

On the other hand, a spur gear having a row of teeth extending in parallel to the axis thereof per se does not withstand the thrust load exerted on the gear teeth in the axial direction.

Under the circumstances noted above, a need has been felt for a high-performance spur gear capable of efficiently transmitting a rotary motion without bringing about vibrations and noises and being especially useful in precision instruments and machines.

OBJECT AND SUMMARY OF THE INVENTION

In view of the drawbacks of the conventional spur gears as noted above, it is an object of the present invention to provide a gear capable of coming into close engagement with a counterpart gear without backlash between the engaged gears to permit smooth transmission of a rotary motion with high efficiency and without involving vibrations and noises.

Another object of the present invention is to provide a gear having a self-aligning function capable of maintaining the degree of parallelization between the axial shafts supporting the gear and a counterpart gear which are in engagement with each other, to thereby transmit the rotary motion with high efficiency, and a function of sufficiently withstanding a thrust load exerted thereon in the axial direction.

A further object of the present invention is to provide a gear having excellent performance, which can be manufactured and miniaturized with ease.

To attain the aforementioned objects according to the present invention there is provided a gear which comprises a circular gear base and double rows of teeth on the circumferential portion of the gear base, which rows of teeth have the individual teeth circumferentially offset from each other.

As one example, the circularly arranged teeth in one of the rows may be offset by one-half the circular pitch relative to those in the other row. Thus, two adjacent teeth in the adjoined rows which are integrally connected are offset circumferentially relative to each other so as to form lateral side faces. When the adjacent offset circumferentially are meshed into between two sets of opposed teeth of a counterpart gear, they bring about a wedging effect in conjunction with the teeth of the counterpart gear and are urged in the opposite directions to each other. Consequently, the teeth of the gear come into close engagement with those of the counterpart gear so as not to form backlash between the teeth of the opposed gears. As a result, the engaged gears permit smooth transmission of a rotary motion with high efficiency and without involving vibrations and noises.

The effect of the lateral side faces formed on the adjacent teeth with the circumferential deviation, consists in preventing the engaged gears from moving in the lateral direction.

Other and further objects of this invention will become obvious from an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
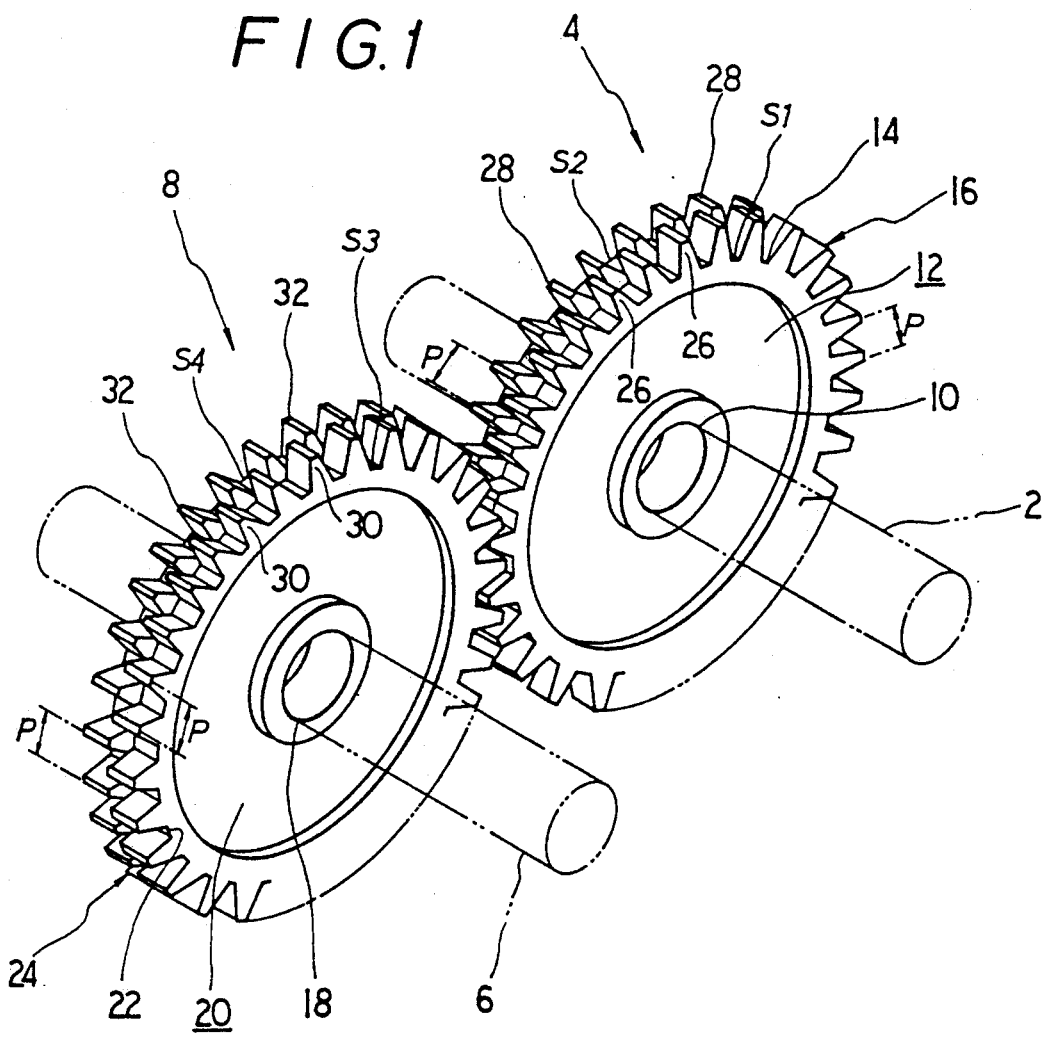
FIG. 1 is a perspective view of engaged gears each having double rows of teeth according to one embodiment of the present invention.
Figure 2A:
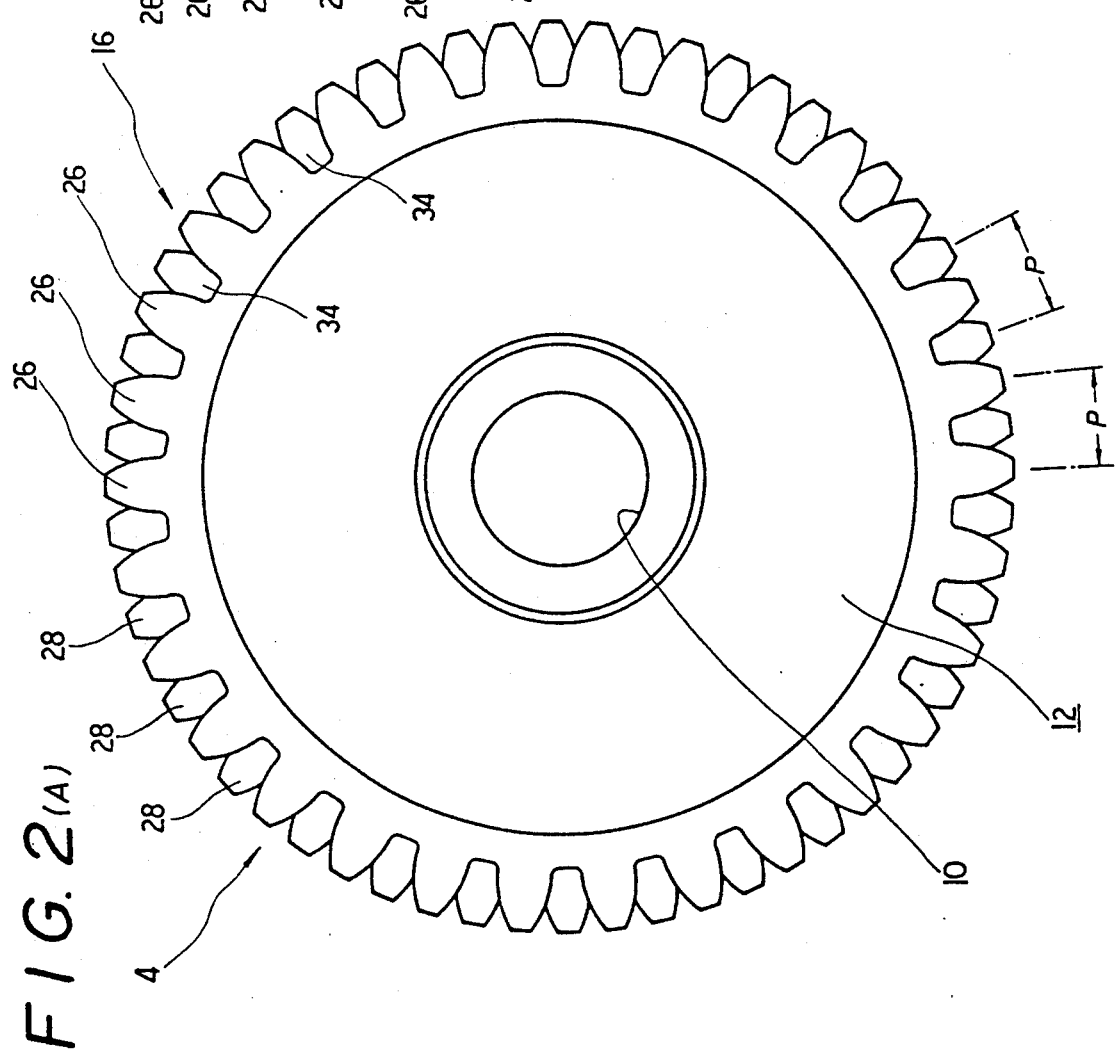
FIGS. 2(A) and 2(B) are a side view and a front view, partly in axial section, of the gear according to this invention.
Figure 2B:
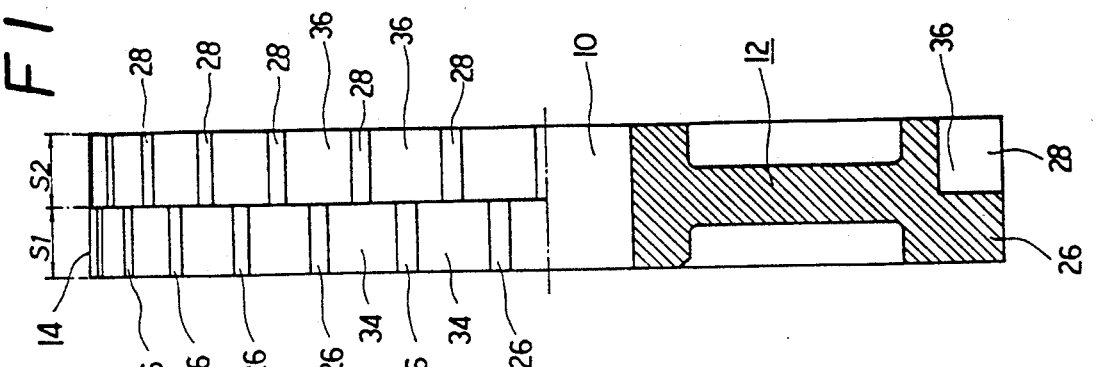
Figure 3:
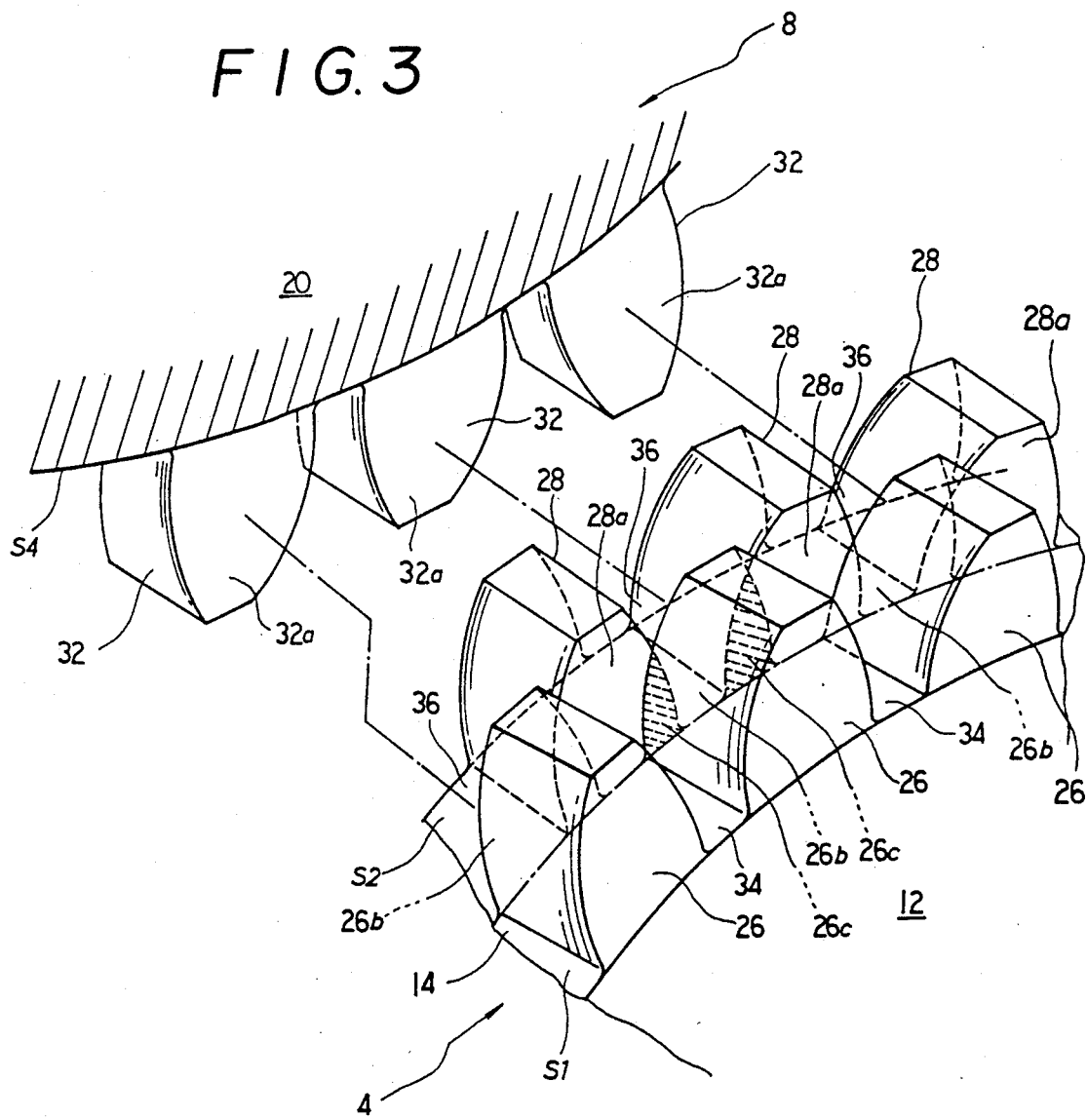
FIG. 3 is partially sectioned, enlarged perspective view of the same.

A gear with double rows of teeth according to this invention, which constitutes a motion-transmitting system in conjunction with another counterpart gear, will be described with reference to FIG. 1 through FIG. 3. A pair of such gears 4, 8 are engaged with each other as illustrated in FIG. 1.

As one example, the gear 4 is supported by a driving shaft 2 connected to a machine or instrument (not shown), and the gear 8 engaged with the gear 4 is supported by a follower shaft 6, so that a rotary motion is transmitted from the driving shaft 2 to the follower shaft 6.

The gear 4 comprises a circular gear base 12 having a center hole 10 into which the shaft 2 is fitted, and two rows S1 and S2 of teeth 16 which are formed on the circumferential portion 14 of the base 12. The teeth 16 in the respective rows S1 and S2 are arranged at a regular pitch P in the circumferential direction and each extend laterally in parallel to the shaft 2 so as to form a common spur toothed gear. Also, the gear 8 comprises a circular gear base 20 having a center hole 18 into which the shaft 6 is fitted, and two rows S3 and S4 of teeth 24 which are formed on the circumferential portion 22 of the base 20, and arranged at a regular pitch P in the respective rows S3 and S4 in the circumferential direction.

The teeth 16 are composed of tooth elements 26 and 28 in the respective rows and integrally joined at portions 26c and each having involute tooth surfaces. The tooth elements 26 are circumferentially aligned in the row S1 on the circumferential portion 14 of the base 12 at a circumferential deviation or offset of one-half the circular pitch of the tooth elements 28 in the row S2. The tooth elements 26 and 28 have the same pitch circle.

The teeth 24 of the gear 8 are composed of tooth elements 30 and 32 in the respective rows, each having involute tooth surfaces. The tooth elements 30 and 32 are arranged at a circumferential deviation of one-half pitch in the circumferential direction, and have the same pitch circle.

In the illustrated embodiment, although the gears 4 and 8 are designed so that the tooth elements 26, 28, 30 and 32 have the same slope and the gear bases 12, 20 have the same diameter, the bases 12, 20 may be made different in diameter, respectively. The teeth of the rows S1 and S3 and the teeth of the rows S2 and S4 are respectively equal in width to each other.

The gears 4 and 8 may be formed of plastic materials such as polyacetal by molding. Otherwise, the gear may be made of zinc, aluminum or other metallic materials by molding or casting, as a matter of course.

The principle of increasing the contact strength of the gear according to this invention will be explained below. When the gears 4 and 8 are mutually engaged, a contact interval is defined between the tooth element 26 in the row S1 of the gear 4 and the tooth element 30 in the row S3 of the counterpart gear 8, and simultaneously, another contact interval is defined between the tooth element 28 in the row S2 of the gear 4 and the tooth element 32 in the row S4 of the gear 8. Since the different contact intervals are concurrently brought about, the contact strength of the engaged gears is increased. As a result, the durability of the gear system can be improved.

Furthermore, the lateral side faces 28a, 26a of the tooth elements 26, 28 of the gear 4 serve as a blocking means for preventing the tooth elements 30 and 32 of the counterpart gear 8 which are meshed with the tooth elements 26 and 28 from moving in the thrust direction. Also, the lateral side face of the tooth elements 30 and 32 of the gear 8 serve as a blocking means for the tooth elements 26 and 28 of the gear 4. Therefore, it is unnecessary to use retaining means for preventing the engaged gears from moving laterally.

Thus, the gears according to this invention can be stably and closely engaged. The close engagement of the gears 4 and 8 can be warranted to permit reliable and efficient transmission of a rotary motion. Besides, since the gears come in close engagement with each other, little vibrations and noises are produced when rotating. Therefore, the gear system according to this invention can desirably be applied to, particularly, printing machines having a function of feeding a sheet precisely.

Figure 4:
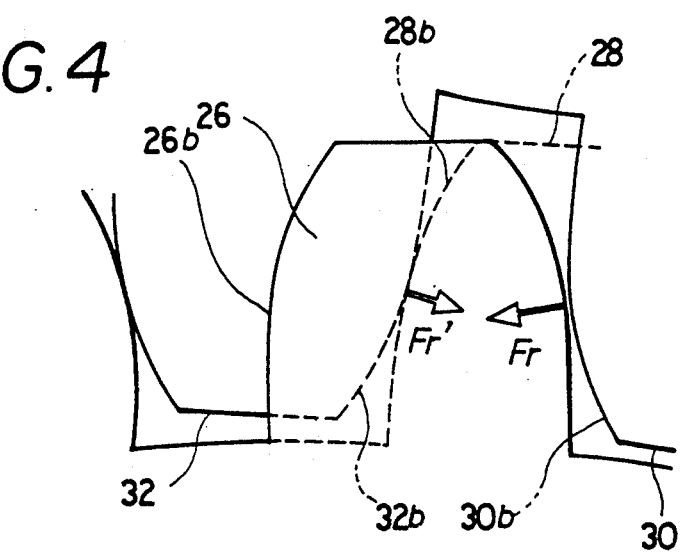
FIG. 4 an explanatory view of the meshed teeth of the gears according to this invention.

The effect of bringing the gears according to this invention into close engagement with each other will be understood from the following explanation made with reference to FIG. 4.

Since the teeth 26 and 28 in the rows S1 and S2 are deviated circumferentially by one-half pitch, the tooth surface 26b of the tooth 26 in the row S1 is diagonally offset from the tooth surface 28b of the adjacent tooth 28 in the row S2. Therefore, when the gears 4 and 8 are mutually engaged, a tooth 26 in the row S1 of the gear 4 enters into the gap between the opposed teeth 30 in the row S3 of the counterpart gear 8 like a wedge, and simultaneously, the tooth 28 in the row S2 of the gear 4 enters into the gap between the opposed teeth 32 in the row S4 of the gear 8. At this time, the tooth surface 26b of tooth 26 of the gear 4 comes into contact with the tooth surface 30b of the tooth 30 of the gear 8, and the tooth surface 28b of the tooth 28 of the gear 4 comes in contact with the tooth surface 32b of the tooth 32 of the gear 8. Since the tooth surfaces 30b, 32b are diagonally offset from each other, the tooth surfaces 26b, 28b are subjected to reactive forces (Fr, Fr') from the tooth surface 30b, 32b. The reactive forces are effected on the meshed teeth of the engaged gears. Accordingly, there is no backlash between the meshed teeth of the gears of this invention, so that the engaged gears can be rotated to effectively transmit the rotary motion without involving wobbling, vibrations and noises.

Although in the aforenoted embodiment, the adjacent teeth in the rows are circumferentially deviated by one-half pitch, this should not however be understood as limitative. The pitch deviation of the adjacent teeth may be arbitrarily determined.

As is apparent from the foregoing, according to the present invention, since the two rows of teeth deviated in the direction of the pitch circle are formed around the gear base, the gears can be mutually engaged without backlash between the meshed teeth to enable transmission of a rotary motion to be carried out with high efficiency and without vibrations and noises. Furthermore, since the gear with the double rows of teeth has the lateral faces on the side surfaces of the teeth, the engaged gears can sufficiently withstand a thrust load exerted thereon to thereby maintain the degree of parallelization between the axial shafts supporting the engaged gears and transmit the rotary motion smoothly and efficiently. The gear of the present invention is simple in structure so that it can be manufactured and miniaturized with ease.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A pair of opposed gears meshed intimately with each other, each gear comprising only a single circular gear base having an axis of rotation and a single outer circumferential surface portion, and a double row of teeth fixedly mounted on said single circumferential surface with the thickness dimension of the teeth parallel to the direction of said axis of said gear, said rows of teeth being fixedly positioned adjacent each other, said teeth having an equal dimension in the circumferential direction and being at an equal pitch and being circumferentially offset from the adjacent teeth in the adjacent tooth row.

2. A pair of gears as claimed in claim 1 in which the teeth in one of said rows are circumferentially offset from the teeth in the other rows a distance equal to one-half the pitch of the teeth.

3. A pair of opposed gears meshed intimately with each other, each gear comprising only a single circular gear base having an axis of rotation and a center hole therein for accommodating a shaft lying along the axis of rotation, and further having a single outer circumferential surface portion, and a double row of teeth fixedly mounted on said single circumferential surface with the thickness dimension of the teeth parallel to the direction of said axis of said gear, said rows of teeth being fixedly positioned adjacent each other, said teeth having involute tooth engaging surfaces and said teeth having an equal dimension in the circumferential direction and being at an equal pitch and being circumferentially offset from the adjacent teeth in the adjacent tooth row a distance equal to one-half the pitch of the teeth.

* * * * *